United States Patent
Miyamori (10) Patent No.: US 6,675,290 B1
(45) Date of Patent: Jan. 6, 2004

(54) PROCESSOR FOR IMPROVING INSTRUCTION UTILIZATION USING MULTIPLE PARALLEL PROCESSORS AND COMPUTER SYSTEM EQUIPPED WITH THE PROCESSOR

(75) Inventor: Takashi Miyamori, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 645 days.

(21) Appl. No.: 09/604,907

(22) Filed: Jun. 28, 2000

(30) Foreign Application Priority Data

Jun. 29, 1999 (JP) .......................... P11-184247
Jun. 26, 2000 (JP) ...................... P2000-191604

(51) Int. Cl.$^7$ ................................. G06F 9/38
(52) U.S. Cl. .................... 712/229; 712/34; 712/215; 713/324
(58) Field of Search .................... 712/34, 215, 229; 713/324

(56) References Cited

U.S. PATENT DOCUMENTS

| | | | | |
|---|---|---|---|---|
| 5,241,636 A | 8/1993 | Kohn | ........................ | 712/215 |
| 5,666,537 A | 9/1997 | Debnath et al. | ............ | 713/322 |
| 5,673,409 A | 9/1997 | Hicok et al. | ................. | 712/229 |
| 5,826,054 A | 10/1998 | Jacobs et al. | ............... | 712/213 |
| 6,189,090 B1 * | 2/2001 | Tan et al. | .................... | 712/229 |

FOREIGN PATENT DOCUMENTS

| | | |
|---|---|---|
| EP | 0 864 960 | 9/1998 |
| GB | 2 317 977 | 4/1998 |
| JP | 10-003425 | 1/1998 |
| WO | WO 99/14669 | 3/1999 |

OTHER PUBLICATIONS

H. Sato, et al., IEEE International Conference on Acoustics, Speech and Signal Processing, vol. 1, XP–000789216, pp. 591–594, "A Dual–Issue Risc Processor for Multimedia Signal Processing", Apr. 21, 1997.

* cited by examiner

*Primary Examiner*—Kenneth S. Kim
(74) *Attorney, Agent, or Firm*—Oblon, Spivak, McClelland, Maier & Neustadt, P.C.

(57) ABSTRACT

The present invention provides a processor capable of carrying out a plurality of operation instructions simultaneously in one cycle which improves utilization of an instruction when carrying out a single operation instruction, and a system equipped with such a processor. In this processor, an operation mode indicating whether or not a coprocessor should be run in parallel is retained in an operation mode register, and in the integer processor operation mode, a value "0" is set in the operation mode register in an operation mode controller of an integer processor, and an instruction register delivers an integer processor instruction to a decoder, so that an execution unit will execute the integer processor instruction, and outputs a no operation instruction to a data processor without embedding an instruction that defines an operation thereof, and puts the data processor in the halt condition. On the other hand, in the parallel processing operation mode, a value "1" is set in the operation mode register in the operation mode controller, and the instruction register delivers the integer processor instruction to the decoder, and outputs a data processor instruction to the data processor to carry out data processing. Because the integer processor operation mode requires the integer processor instruction alone in the instruction string, utilization of the instructions can be improved.

20 Claims, 7 Drawing Sheets

PROCESSOR FOR IMPROVING INSTRUCTION UTILIZATION USING MULTIPLE PARALLEL PROCESSORS AND COMPUTER SYSTEM EQUIPPED WITH THE PROCESSOR

BACKGROUND OF THE INVENTION

1. Field of the Invention

The present invention relates to a processor apparatus and a computer system equipped with such a processor apparatus, and more particularly relates to a technique to improve instruction utilization of an instruction in a single operation processing mode, in which a coprocessor is not run in parallel in a parallel processor including a plurality of processors and thereby being capable of processing a plurality of operations in one clock cycle.

2. Background Art

Figure 1:
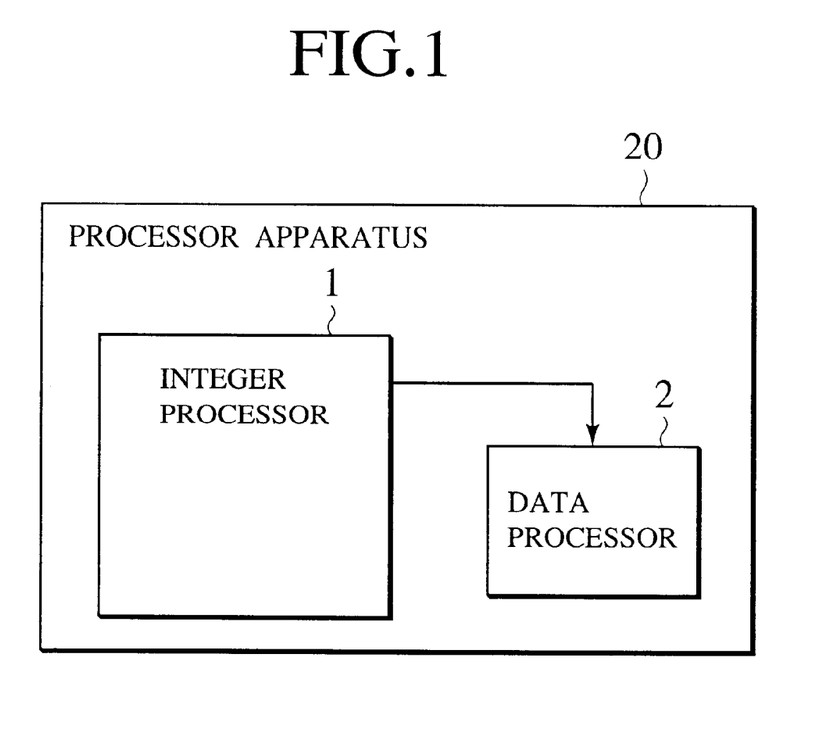
FIG. 1 is a block diagram schematically showing an arrangement of a conventional multiple parallel processor apparatus which carries out a plurality of operations simultaneously.

Conventionally, a multiple parallel processor which carries out a plurality of operation instructions in one clock cycle has been put into practical use. FIG. 1 is a block diagram schematically showing an arrangement of such a multiple parallel processor. A processor apparatus 20 comprises an integer processor 1 which chiefly controls data transfer from a memory and an execution flow, and one or more than one data processor 2 which chiefly carries out data processing defined by an extended instruction. The integer processor 1 chiefly carries out an addition/subtraction instruction, a branch instruction, a load instruction into a data memory, data read/write instructions, etc. On the other hand, the data processor 2 carries out data processing including, for example, an arithmetic operation defined by an extended instruction, such as an SIMD (Single Instruction stream Multiple Data stream), in parallel with the integer processor 1.

By operating the integer processor 1 and data processor 2 concurrently, two or more operation instructions can be carried out simultaneously in parallel in one clock cycle.

Figure 2:
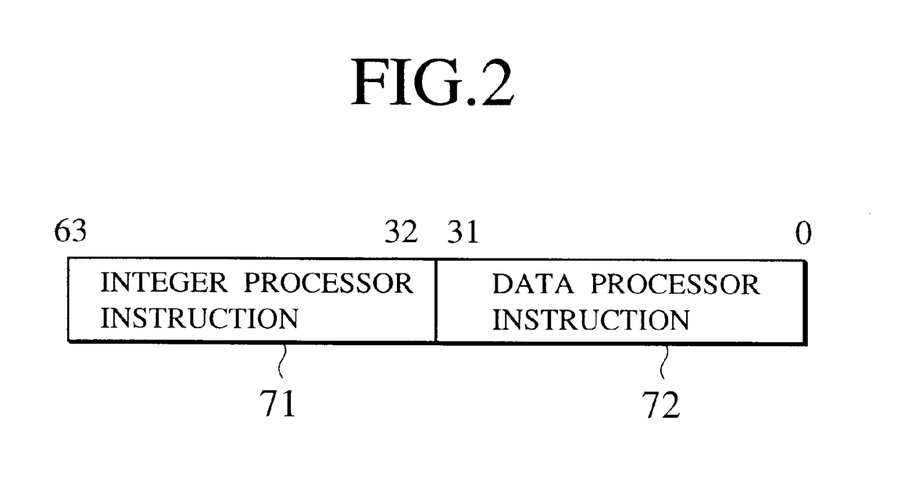
FIG. 2 is a diagram showing an example of an instruction format used by the conventional multiple parallel processor.

The instruction format that operates the processor apparatus 20 comprises, as shown in FIG. 2 for example, an instruction portion 71 that defines an operation of the integer processor 1, and another instruction portion 72 that defines an operation of the data processor 2. Each of these instructions 71 and 72 comprises a 32-bit instruction, for example.

However, the conventional multiple parallel processor apparatus 20 has the following problems. That is, an instruction string of a program to be carried out by the processor apparatus 20 includes a great number of instructions that define a single operation processing, by which the integer processor 1 alone is run even for an extended instruction. For an instruction format corresponding to such a single operation processing, the conventional processor apparatus 20 has to embed an instruction not to run any unit (no operation instruction: NOP instruction) into the portion 72 that defines an operation of the data processor 2 in the instruction format shown in FIG. 2. Consequently, utilization of instructions, especially extended instructions, is reduced, and a capacity of an instruction memory for storing instructions is undesirably increased.

SUMMARY OF THE INVENTION

The present invention is devised to solve the problems of the conventional multiple parallel processor, that is, an extended instruction is not utilized efficiently when carrying out a single operation, and a capacity of an instruction memory for storing instructions is undesirably increased.

It is therefore an object of the present invention to provide a multiple parallel processor capable of carrying out a plurality of operations in one clock cycle, which is a parallel processor capable of improving utilization of an extended instruction in a single operation mode by generating a control signal to stop the operation of any other data processor (coprocessor) and sending the control signal to the other data processor, and thereby improving availability of the instruction memory.

According to an aspect of the present invention, there is provided a parallel processor for processing a plurality of operation instructions in one cycle in parallel, comprising:

a first operation processor; and at least one second operation processor, the first operation processor including, an operation mode retaining unit for retaining an operation mode indicating whether or not the second operation processor should be run in parallel to carry out an operation instruction, wherein the operation mode has a first mode in which the first operation processor alone is operated, and a second operation mode in which both of the first operation processor and the second operation processor are operated, a control unit for, in case that the operation mode is the first operation mode, in accordance with the operation mode, supplying the first operation processor with an instruction sequence that defines an operation of the first operation processor, and for generating a control signal to halt an operation of the second operation processor and supplying the control signal to the second operation processor, whereby as to an instruction of the first operation mode, the second operation processor is not operated without embedding an instruction that defines an operation of the second operation processor in the instruction sequence retained in an instruction memory, and an instruction execution unit for switching the operation mode in accordance with an input decoded instruction.

When the operation mode is the second operation mode, the control unit may supply the first operation processor with an instruction string that defines an operation thereof, and supply the second operation processor with an instruction string that defines an operation thereof.

The control signal may be a no operation instruction.

In the first operation mode, the instruction sequence retained in the instruction memory may include only an instruction that defines an operation of the first operation processor.

The control unit may include a no operation instruction retaining unit for retaining the no operation instruction; and in the first operation mode, the instruction string retained in the instruction memory may constantly include a plurality of instructions.

Alternatively, the control signal may be a signal that stops a supply of a clock to the second operation processor.

Alternatively, the control signal maybe a disable signal of the second operation processor.

The instruction execution unit may switch the operation mode retained in the operation mode retaining unit by executing a sub-routine call instruction directing an operation mode switching.

Here, the operation mode retaining unit may be an operation mode register; the control unit may include a first return address register for retaining a return address from the sub-routine call instruction; the instruction execution unit, when executing the sub-routine call instruction, may switch the operation mode by inverting a value in the operation mode register, and set information indicating inversion of the operation mode in the first return address register, and when returning from the sub-routine call instruction, may refer to the information indicating the inversion of the operation mode set in the first return address register, and if the inversion is set, return to the operation mode set before the sub-routine call instruction by inverting the value in the operation mode register.

The instruction execution unit may switch the operation mode retained in the operation mode retaining unit at an occurrence of an exception.

The operation mode retaining unit may be an operation mode register; the control unit may include a second return address register for retaining a return address from an exception program by which the exception is carried out; the instruction execution unit, at an occurrence of the exception, may switch the operation mode by inverting the value in the operation mode register, and set information indicating inversion of the operation mode in the second return address register, and when returning from the exception, may refer to the information indicating the inversion of the operation mode set in the second return address register, and if the inversion is set, return to the operation mode set before the exception by inverting the value in the operation mode register.

The instruction execution unit may switch the operation mode by inverting the value in the operation mode retaining unit in accordance with information indicating inversion of the operation mode contained in a part of a jump address defined in a jump instruction.

The second operation processor may comprise a plurality of coprocessors; and the control unit, in the first operation mode, may operate the first operation processor alone by stopping clocks to the plurality of coprocessors other than the first operation processor.

According to another aspect of the present invention, the above parallel processor further comprises:

an extended operation mode retaining unit for retaining an extended operation mode indicating which of the plurality of operation processors should be operated to carry out the operation instruction in parallel, wherein, the control unit supplies the control signal to, in accordance with the extended operation mode, the second operation processor other than the second operation processor which is indicated by the extended operation mode.

According to still another aspect of the present invention, there can be provides a computer system equipped with a parallel processor for processing more than one operation instruction in one cycle, comprising: a first operation processor; at least one second operation processor; and a data memory, the first operation processor including, an operation mode retaining unit for retaining an operation mode indicating whether or not the second operation processor should be run in parallel to carry out an operation instruction, wherein the operation mode has a first operation mode in which the first operation processor alone is operated, and a second operation mode in which both of the first operation processor and the second operation processor are operated, a control unit for, in case that the operation mode is the first operation mode, in accordance with the operation mode, supplying the first operation processor with an instruction sequence that defines an operation of the first operation processor, and for generating a control signal to halt an operation of the second operation processor and supplying the control signal to the second operation processor, whereby as to an instruction of the first operation mode, the second operation processor is not operated without embedding an instruction that defines an operation of the second operation processor in the instruction sequence retained in an instruction memory, and an instruction execution unit for switching the operation mode in accordance with an input decoded instruction.

Various further and more specific objects, features and advantages of the invention will appear from the description given below, taken in connection with the accompanying drawings illustrating by way of example a preferred embodiments of the invention.

DETAILED DESCRIPTION OF THE PREFERRED EMBODIMENTS

First Embodiment

The following description will describe in detail a first embodiment of the present invention with reference to the accompanying drawings.

The first embodiment provides a multiple parallel processor apparatus capable of carrying out a plurality of operations in one clock cycle with a function, by which an operation mode indicating whether a data processor should be run in parallel or not is set, and in a single operation mode, the data processor is put in the halt condition by generating a no operation instruction and sending the same no operation instruction to the data processor in accordance with the operation mode.

Figure 3:
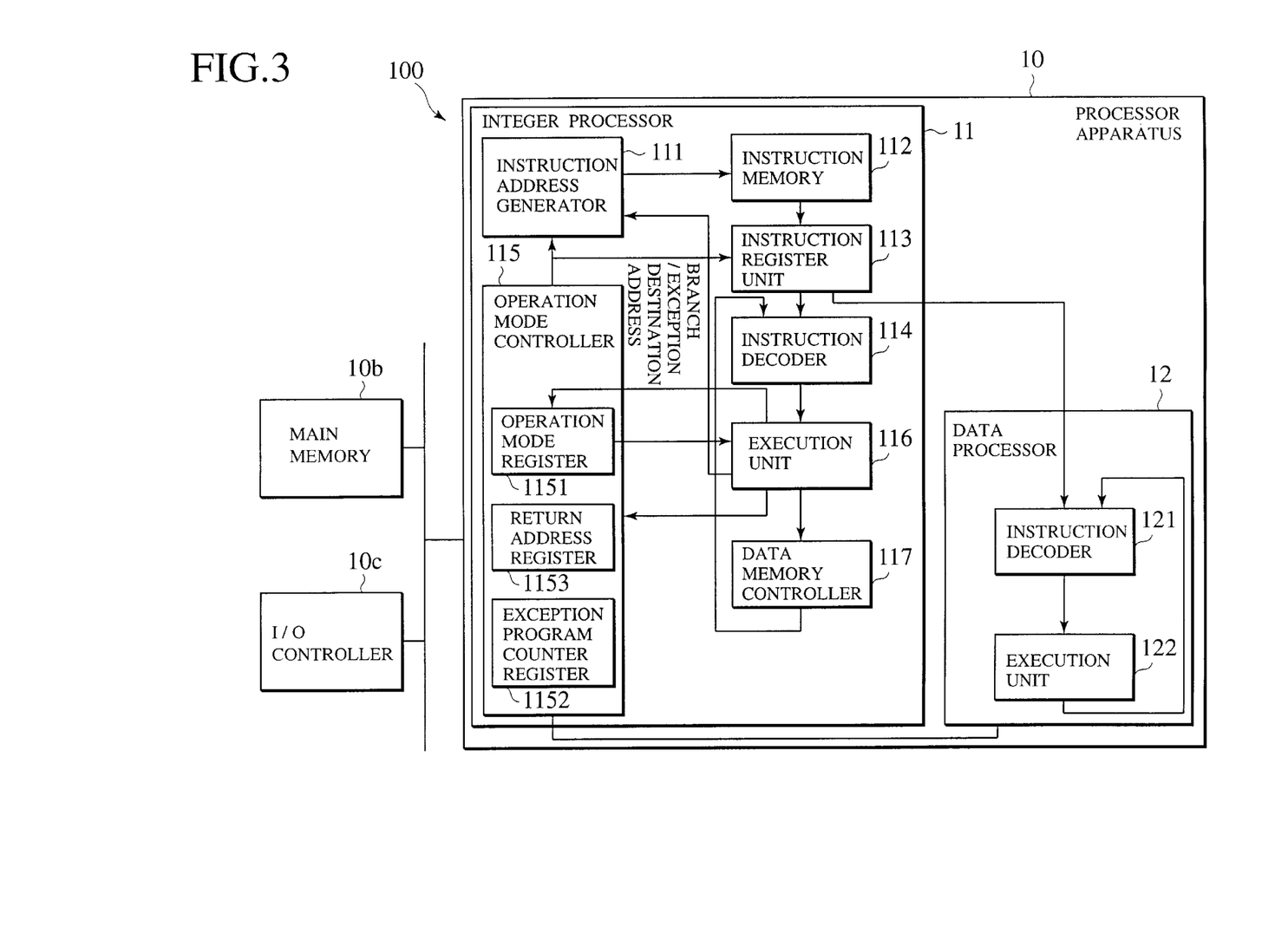
FIG. 3 is a block diagram depicting an arrangement of a multiple parallel processor according to a first embodiment of the present invention and a system equipped with the same.

FIG. 3 is a block diagram schematically showing an arrangement of a parallel processor apparatus according to the first embodiment of the present invention. A multiple parallel processor apparatus (hereinafter, referred to simply as processor apparatus) 10 comprises an integer processor 11 and a data processor 12.

Further, the processor apparatus 10 is connected to both a main memory 10b and an I/O controller 10c via a bus or a network, thereby constituting a computer system.

The integer processor 11 comprises an instruction address generator 111, an instruction memory 112, an instruction register unit 113, an instruction decoder 114, an operation mode controller 115, an execution unit 116, and a data memory controller 117, and chiefly controls data transfer from the memory and an execution flow.

It should be noted that the operation mode controller 115 and instruction register unit 113 correspond to a control unit according to claims below.

The data processor 12 comprises an instruction decoder 121 and an execution unit 122 for the data processor, and chiefly carries out data processing, such as an arithmetic operation. It should be appreciated that more than one data processor 12 can be provided for one integer processor 11.

The processor apparatus 10 operates in two modes: (1) an integer processor operation mode, and (2) a parallel processing operation mode. In the integer processor operation mode, the processor apparatus 10 operates by running the integer processor 11 alone. On the other hand, in the parallel processing operation mode, the processor apparatus 10 operates by running both the integer processor 11 and data processor 12 simultaneously in parallel.

The operation mode controller 115 comprises an operation mode register 1151 which indicates the current operation mode, and changes the operation mode in accordance with a value in the register 1151. The operation mode indicates whether or not the data processor should be run in parallel to carry out an arithmetic operation instruction. For example, a value "0" in the operation mode register 1151 indicates the integer processor operation mode, and an inverted value "1" therein indicates the parallel processing operation mode.

The operation mode controller 115 comprises the operation mode register 1151, an exception program counter register 1152, and a return address register 1153. The operations of these registers will be described below.

Figure 4:
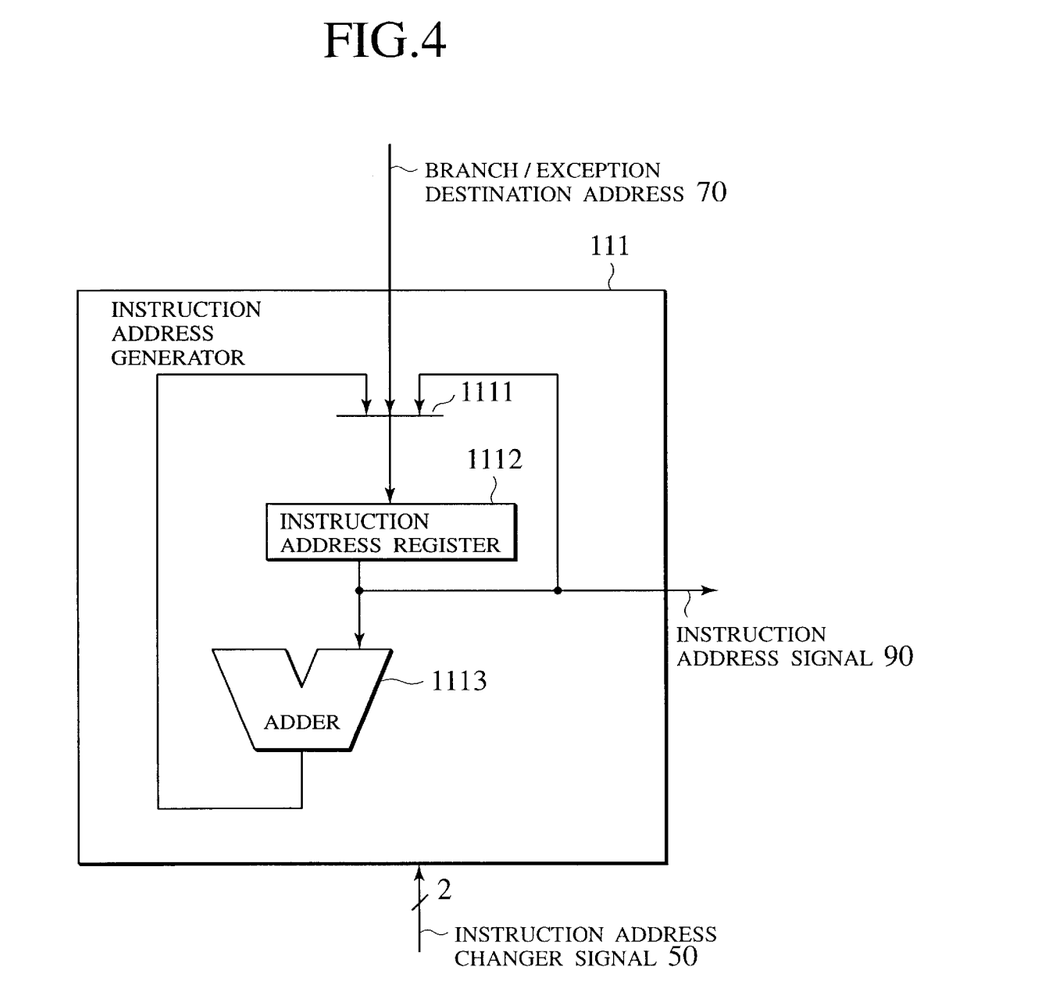
FIG. 4 is a circuit diagram showing an example of a detailed arrangement of an instruction address generator of FIG. 3.

FIG. 4 is a circuit diagram showing an example of a detailed arrangement of the instruction address generator 111 of FIG. 3. The instruction address generator 111 comprises a selector 1111, an instruction address register 1112, and an adder 1113, and receives a branch/exception address 70 from the execution unit 116 and an instruction address changing signal 50 from the operation mode controller 115, and outputs an instruction address signal 90.

Figure 5:
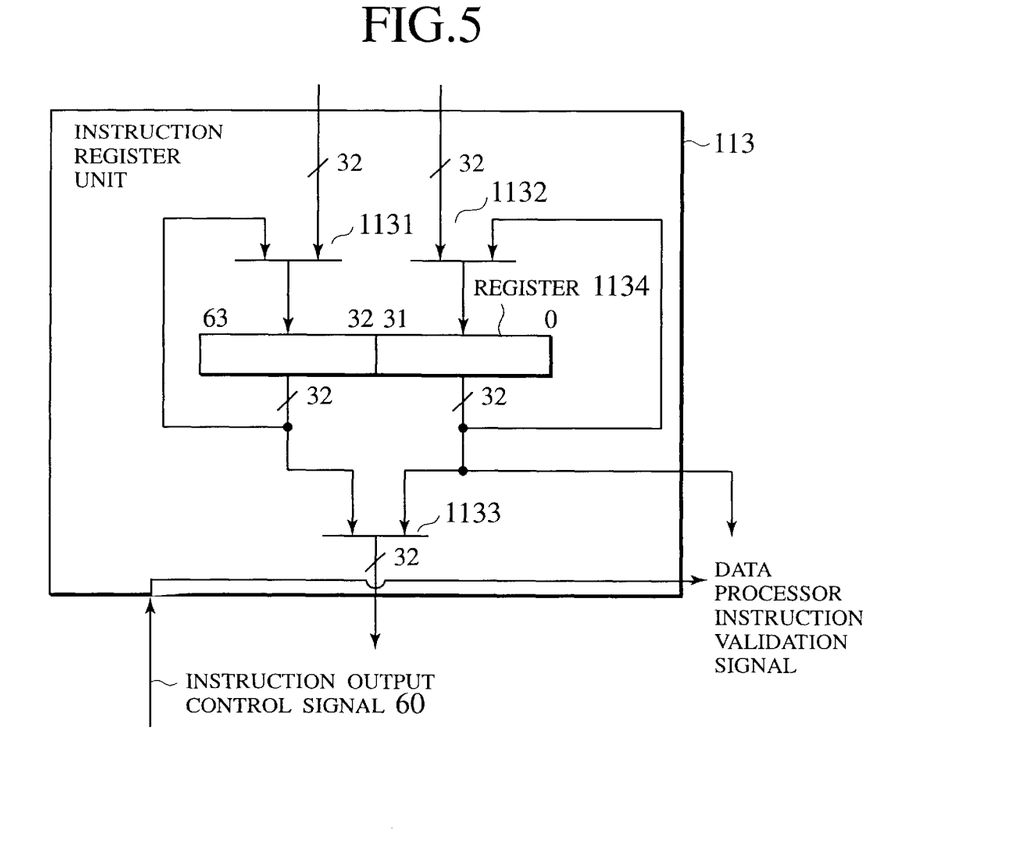
FIG. 5 is a circuit diagram showing an example of a detailed arrangement of an instruction register unit of FIG. 3.

FIG. 5 is a circuit diagram showing an example of a detailed arrangement of the instruction register unit 113 of FIG. 3. The instruction register unit 113 comprises selectors 1131 through 1133 and a register 1134. The register 1134 retains either the integer processor instruction alone or the integer processor instruction and data processor instruction. In accordance with an instruction output control signal 60 outputted from the operation mode controller 115 based on the operation mode, the instruction register unit 113 outputs the integer processor instruction to the instruction decoder 114 and the instruction output control signal 60 serving as instruction enabling (validation) signal to the data processor 12, or outputs the integer processor instruction to the instruction decoder 114 and the data processor instruction to the data processor 12.

When the operation mode is the single operation mode (in the first embodiment, the integer processor operation mode), a signal indicating that outputted data processor instruction is disabled can be outputted to the data processor 12. Alternatively, as will be described below with reference to FIG. 7, in case that two or more instructions (a group of instructions that should be carried out consecutively in two or more cycles) are stored in a single instruction format even for an operation in the single operation mode, it may be arranged in such a manner that a no operation instruction retaining circuit 1135 for storing the no operation instruction in advance is formed by a multiplexer, for example, and the no operation instruction is outputted consecutively to the data processor 12 for a necessary number of clock cycles from the no operation instruction retaining circuit 1135.

Next, the following description will describe an operation in each operation mode retained in the operation mode register 1151.

(1) Integer Processor Operation Mode (Single Processing Operation Mode)

Figure 6:
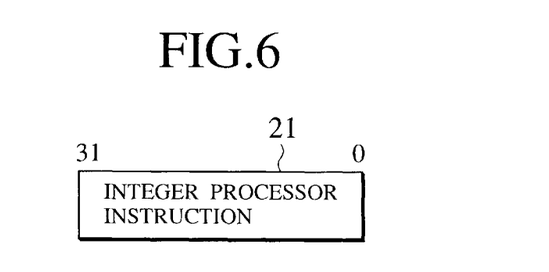
FIG. 6 is a diagram showing an example of an instruction format in a single operation mode used by the processor apparatus of FIG. 3.

In the first place, in the integer processor operation mode (the value in the operation mode register 1151 is "0"), an instruction format as shown in FIG. 6 is used. Here, the initial value of the operation mode retained in the operation mode register 1151 is "0", and therefore, the processor apparatus 10 starts to operate in the integer processor operation mode. The instruction format in this case comprises a 32-bit instruction that defines an operation of the integer processor 111.

Figure 7:
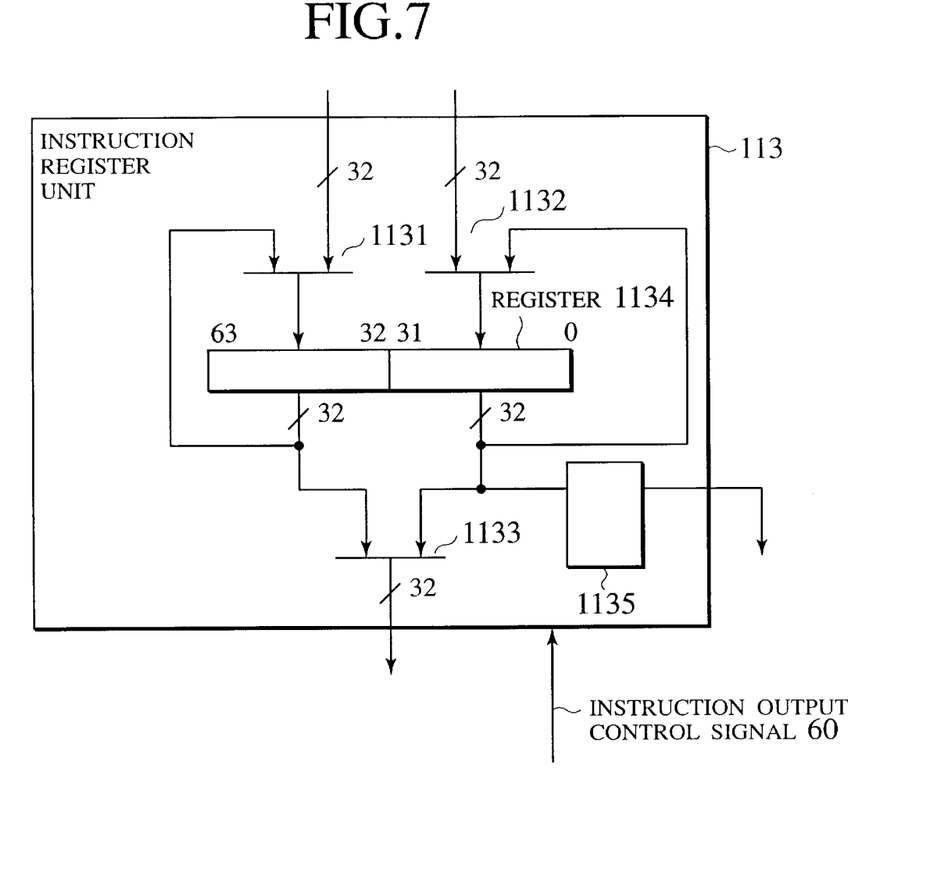
FIG. 7 is a diagram showing an example of a detailed arrangement of the instruction register unit of FIG. 3 according to a modification of the first embodiment of the present invention.

Alternatively, as shown in FIG. 7 as a modification of the first embodiment, the no operation instruction retaining circuit 1135 for storing the no operation instructions in advance is formed by a multiplexer or the like in the instruction register unit 113, so that, in case of the integer processor operation mode, the no operation instruction retained in the no operation instruction retaining circuit 1135 will be outputted to the data processor 12 constantly in response to the instruction output control instruction 60. According to the above arrangement, in the integer processor operation mode, two integer processor instructions 21 of 32-bit long each, which should be carried out in two clock cycles, can be set in an instruction format stored in the instruction memory 112, thereby making it possible to constantly store an instruction group of 64-bit long. Consequently, availability of the instruction memory 112 can be improved.

The followings are the jobs defined by the integer processor instruction 21 by using the register, calculator, and data on the memory in the integer processor 11:

(a) adding, subtracting, branching, data downloading from the memory, and data storing into the memory;
(b) specifying the integer processor register as data input;
(c) specifying the integer processor register as data output:
(d) specifying immediate data;
(e) specifying a read address from the memory; and
(f) specifying a branch condition.

Next, the following description will describe an operation of each function block within the integer processor 11 in the integer processor operation mode.

In the first place, as shown in FIG. 2, the instruction address generator 111 receives the 2-bit instruction address changing signal 50 from the operation mode controller 115, and updates the value in the instruction address register 1112 and an output of the instruction address signal 90 to be sent to the instruction memory 112.

The instruction address changing signal 50 defines the jobs as follow:

00: save the value in the instruction address register 1112;

01: increment by 8 the value in the instruction address register 1112 (when executing 64-bit of instruction);

10: set an input value from the execution unit 116 to the instruction address register 1112 (when executing a branch or an exception);

11: (reserved).

At the occurrence of a branch or an exception, the operation mode controller 115 sets "10" in the instruction address changing signal 50, and effects the control in such a manner that a branch address or a jump address of the exception calculated by the execution unit 116 is stored into the instruction address register 1112. Also, after the 64-bit (two 32-bit instructions) integer processor instruction 21 is executed, the operation mode controller 115 sets "01" in the instruction address changing signal 50, and effects the control in such a manner that the next 64-bit instruction will be read out from the instruction memory 112.

The instruction register unit 113 outputs the 32 bits in the high order or the 32 bits in the low order in the 64-bit instruction read out from the instruction memory 112 to the instruction decoder 114 in accordance with the instruction output control signal 60 inputted from the operation mode controller 115.

Here, when the processor apparatus 10 is initialized by a reset signal, a value "0" is inputted into the operation mode register 1151 in the operation mode controller 115, and therefore, set in the integer processor operation mode.

In the integer processor operation mode, the instruction register unit 113 constantly supplies the no operation instruction to the data processor 12 so as not to run the data processor 12, and outputs the integer processor instruction 21 in the high order to the instruction decoder 114. Alternatively, as has been discussed above, it may be arranged in such a manner that the 64-bit (two instructions) instruction is constantly inputted into the instruction register unit 113 from the instruction memory 112, and these instructions are processed consecutively by the instruction execution unit 116 in two cycles.

The instruction decoder 114 decodes the integer processor instruction 21 received from the instruction register unit 113, reads out the value in an integer processor register (not shown) in the instruction decoder 114, detaches immediate data from the instruction, and outputs the same, to the execution unit 116 in accordance with the decoded instruction.

The execution unit 116 executes the decoded instruction in accordance with the input data from the instruction decoder 114 and a direction in the integer processor instruction 21, and outputs the arithmetic operation result to the data memory controller 117. Also, the execution unit 116 notifies the operation mode controller 115 of the execution of a branch instruction or the occurrence of an exception, and supplies the branch address or exception address to the instruction address generator 111.

The data memory controller 117 receives data from the execution unit 116, reads out data from the address specified by a direction in the instruction, and outputs the result to the instruction decoder 114 or writes the data. Alternatively, the result in the execution unit 116 may be outputted directly to the instruction decoder 114.

The instruction decoder 114 stores the data sent from the data memory unit 117 into the internal integer processor register (not shown).

(2) Parallel Processing Operation Mode

Figure 8:
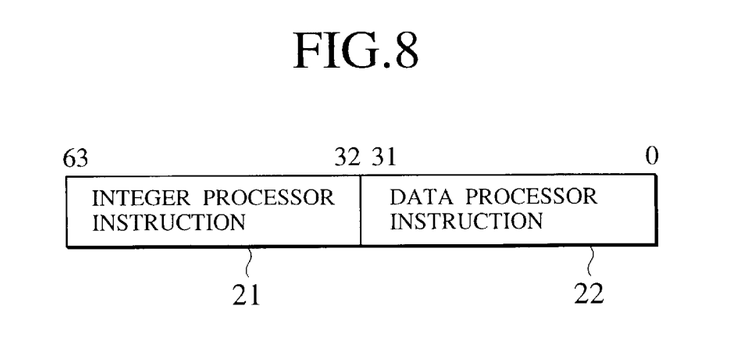
FIG. 8 is a diagram showing an example of an instruction format used by the modification of the first embodiment and in a parallel processing mode.

In the second place, the following description will describe an operation in the parallel processing operation mode (the value in the operation mode register 1151 is "1"). FIG. 8 also shows an example of an extended instruction format used in the parallel processing operation mode.

The instruction format executed in the parallel processing operation mode comprises a 32-bit instruction (63rd bit to 32nd bit) 21 that defines an operation of the integer processor 11, and another 32-bit instruction (31st bit to 0 bit) 22 that defines an operation of the data processor 12.

When an operation mode switching action is detected by an event described below in the execution unit 116, the execution unit 116 carries out the operation mode switching in the integer processor 11, and switches the value in the operation mode register 1151 in the operation mode controller 115 to "1". Thereafter, the operation mode controller 115 controls the instruction register unit 113 to carry out the parallel processing operation.

In the parallel processing operation mode, the operation mode controller 115 effects the control in such a manner that a 64-bit instruction is taken out from the instruction register unit 113, and the 32-bit integer processor instruction 21 is supplied to the instruction decoder 114 and onwards, and the other 32-bit data processor instruction 22 to the data processor 12. The integer processor instruction 21 is executed in the same manner as in the integer processor operation mode by the instruction decoder 114, the execution unit 116, and data memory 117.

In the parallel processing operation mode, as shown in FIGS. 5 and 7, the instruction address generator 111 receives the 2-bit instruction address changing signal 50 from the operation mode controller 115, and updates the value in the instruction address register and an output of the instruction address signal to be sent to the instruction memory 112.

Here, the instruction address changing signal defines. the jobs as follow:

00: save the value in the instruction address register;

01: increment by 8 the value in the instruction address register (when executing a 64-bit instruction);

10: set an input value from the execution unit into the instruction address register (when executing a branch or an exception); and 11: (reserved).

When no branch or exception occurs, the operation mode controller 115 sets "01" in the instruction address changing signal, and effects the control in such a manner that the 64-bit instruction is supplied from the instruction memory 112 to the instruction register unit 113.

The instruction register unit 113 outputs the 32 bits in the high order of the 64-bit instruction read out from the instruction memory 112 to the instruction decoder 114, and outputs the remaining 32 bits in the low order to the instruction decoder 121 in the data processor 12 in accordance with the instruction output control signal 60 inputted from the operation mode controller 115.

The data processor 12 receives the data processor instruction 22 from the instruction register unit 113, and executes that instruction by using the instruction decoder 121 and execution unit 122.

The instruction decoder 121 in the data processor 12 decodes the input data processor instruction 21, reads out the value in a data processor register (not shown) in the instruction decoder 121, detaches immediate data from the instruction, and outputs the same to the execution unit 122 in accordance with the decoded instruction.

The execution unit 122 executes the instruction in accordance with the input data from the instruction decoder 121 and a direction from the data processor instruction 22, and outputs the arithmetic operation result to the instruction decoder 121. The instruction decoder 121 stores the arithmetic operation result in the data processor register (not shown) in the instruction decoder 121.

(3) Operation Mode Switching

Next, the following description will describe a switching method between the integer processor operation mode and parallel processing operation mode.

(a) Switching Operation by Sub-routine Call

The execution unit 116 in the integer processor 11 stores, when executing a sub-routine call instruction directing the operation mode switching, a return address from the sub-routine into the return address register 1153 in the operation mode controller 115, and updates the value in the program counter. At the same time, the execution unit 116 outputs, as the branch address, the head address of the branch destination sub-routine from the instruction address generator 111 to the instruction memory 112 to allow a jump to the sub-routine, and inverts the operation mode.

In other words, the instruction execution unit 116 outputs a control signal that inverts the value in the operation mode register 1151 in the operation mode controller 115, so that when the current mode is the integer processor operation mode, the operation mode is inverted to the parallel processing operation mode, and when the current mode is the parallel processing operation mode, the operation mode is inverted to the integer processor operation mode. In addition, the execution unit 116 sets a value "1" in the least significant bit in the return address register 1152. If this bit exhibits "1", it indicates that the operation mode has been inverted.

Also, at the time of returning from sub-routine, the execution unit 116 outputs the branch address to the instruction address generator 111, so that a jump is caused by changing the value in the program counter at the jump instruction in returning from the sub-routine instruction. At the same time, when the least significant bit in the jump address exhibits "1", the execution unit 116 outputs a control signal to the operation mode controller 115, so that the value in the operation mode register 1151 in the operation mode controller 115 will be inverted. In this manner, the processor apparatus 10 returns to the operation mode set before the sub-routine call.

b) Switching by the Occurrence of Exception

When an exception occurs, the current operation mode shifts to the integer processor operation mode. If the operation mode has been set in the parallel processing operation mode when the exception occurred, the execution unit 116 in the integer processor 11 outputs a control signal that inverts the value in the operation mode register 1151 in the operation mode controller 115 to the operation mode controller 115, so that the operation mode will be switched to the integer processor operation mode.

Also, the execution unit 116 sets a value "1" in the least significant bit in the exception program counter register 1152 in the operation mode controller 115 that indicates the return address from the exception handler. If this bit exhibits "1", it indicates that the operation mode has been inverted.

After the execution of the return instruction from the exception, the execution unit 116 sets a value in the exception program counter register 1152 in the operation mode controller 115 in such a manner that a jump is caused by changing the value in the program counter. At the same time, when the least significant bit in the exception program counter register 1152 exhibits a value "1", the execution unit 116 outputs a control signal to the operation mode controller 115, so that the value in the operation mode register 1151 in the operation mode controller 115 will be inverted. In this manner, the processor apparatus 10 returns to the operation mode set before the occurrence of the exception.

According to the first embodiment, in the integer processor operation mode, an operation instruction can be supplied to the data processor 12 from the instruction register unit 113 without embedding an instruction (data processor instruction) that defines an operation of the data processor 12 into an instruction string of an extended instruction, thereby making it possible to improve utilization of the instruction related to the extended instruction. Hence, it is no longer necessary to secure a memory capacity to store the no operation instruction in the instruction memory 112, thereby making it possible to improve availability of the instruction memory.

In the first embodiment, the signal outputted to the data processor 12 was explained as the no operation instruction. However, the data processor 12 may be put in the halt condition by generating arbitrary enable and disable signals and sending the same to the data processor 12.

Second Embodiment

Next, the following description will describe a processor apparatus according to a second embodiment of the present invention.

In the second embodiment, the data processor 12 is put in the halt condition not by using the no operation instruction of the first embodiment, but by switching OFF a clock enable signal supplied to the data processor 12.

Figure 9:
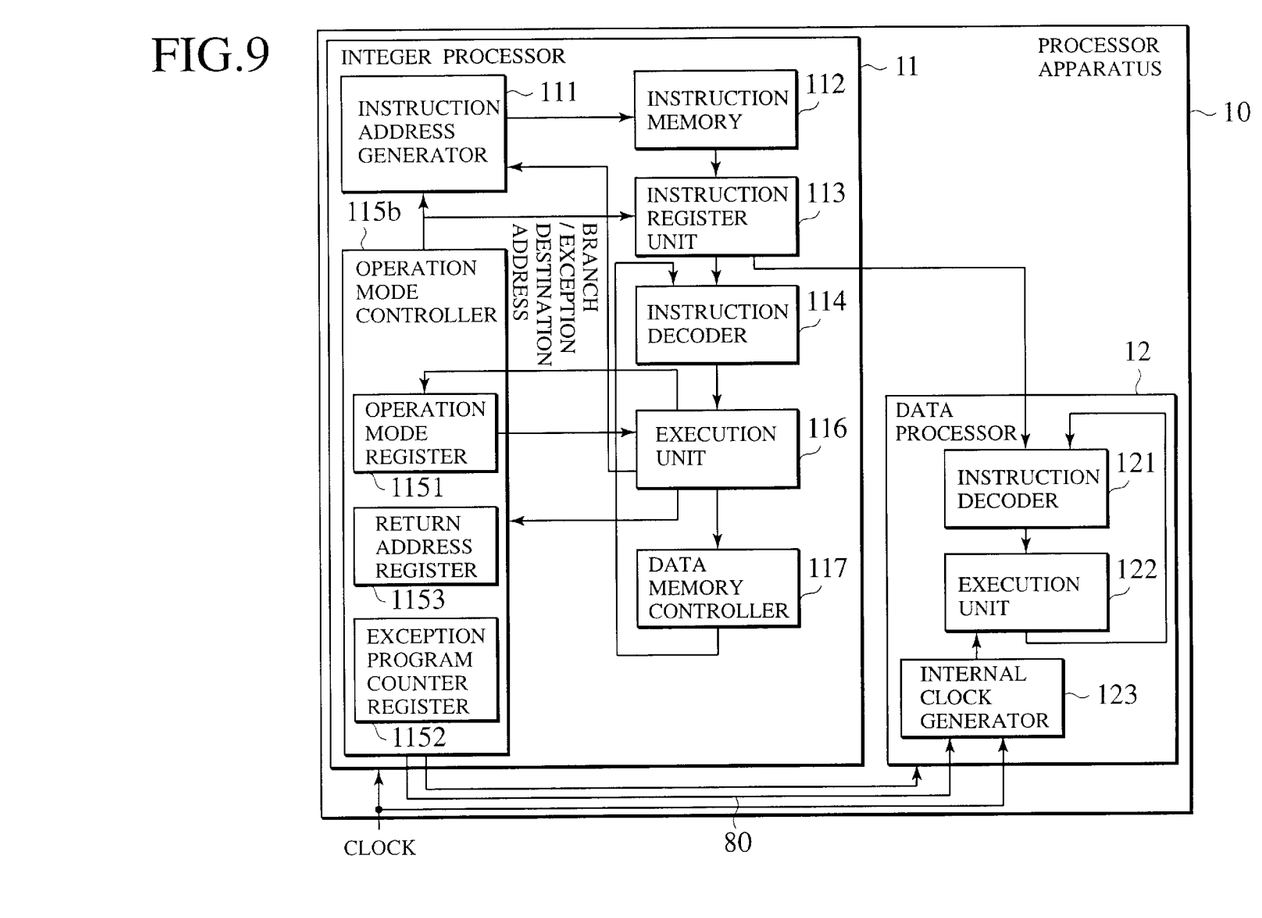
FIG. 9 is a block diagram depicting an arrangement of a multiple parallel processor apparatus according to a second embodiment of the present invention.

FIG. 9 is a block diagram depicting an arrangement of the processor apparatus according to the second embodiment of the present invention. Hereinafter, like components are labeled with like reference numerals with respect to the first embodiment shown in FIG. 3, and the explanation of these components is omitted for ease of explanation. In the first embodiment, the instruction register unit 113 effects the control, in the integer processor operation mode, in such a manner that the data processor 12 will not run by sending the no operation instruction to data processor 12. However, in the second embodiment, the data processor 12 is controlled not to run by stopping the supply of a clock CLK to the data processor 12.

To be more specific, an operation mode controller 115b switches OFF a clock enable signal 80 in the integer processor operation mode during which a value "0" is set in the operation mode register 1151, and stops the internal clock generator 123 in the data processor 12, thereby stopping the supply of the clock to the data processor 12. The rest of the operations are carried out in the same manner as in the first embodiment.

On the other hand, the operation mode controller 115 switches ON the clock enable signal 80 in the parallel processing operation mode, during which a value "1" is set in the operation mode register 1151, and runs the internal clock generator 123 in the data processor 12, thereby supplying the clock to the data processor 12. The rest of the operations are carried out in the same manner as in the first embodiment.

According to the second embodiment, the data processor is stopped in the integer processor operation mode by stopping the supply of the clock to the data processor. Consequently, not only can the power consumption be saved, but also the utilization of the instruction related to the extended instruction can be improved because the no operation instruction does not have to be supplied to the data processor 12.

Third Embodiment

Next, the following description will describe a processor apparatus according to a third embodiment of the present invention.

Figure 10:
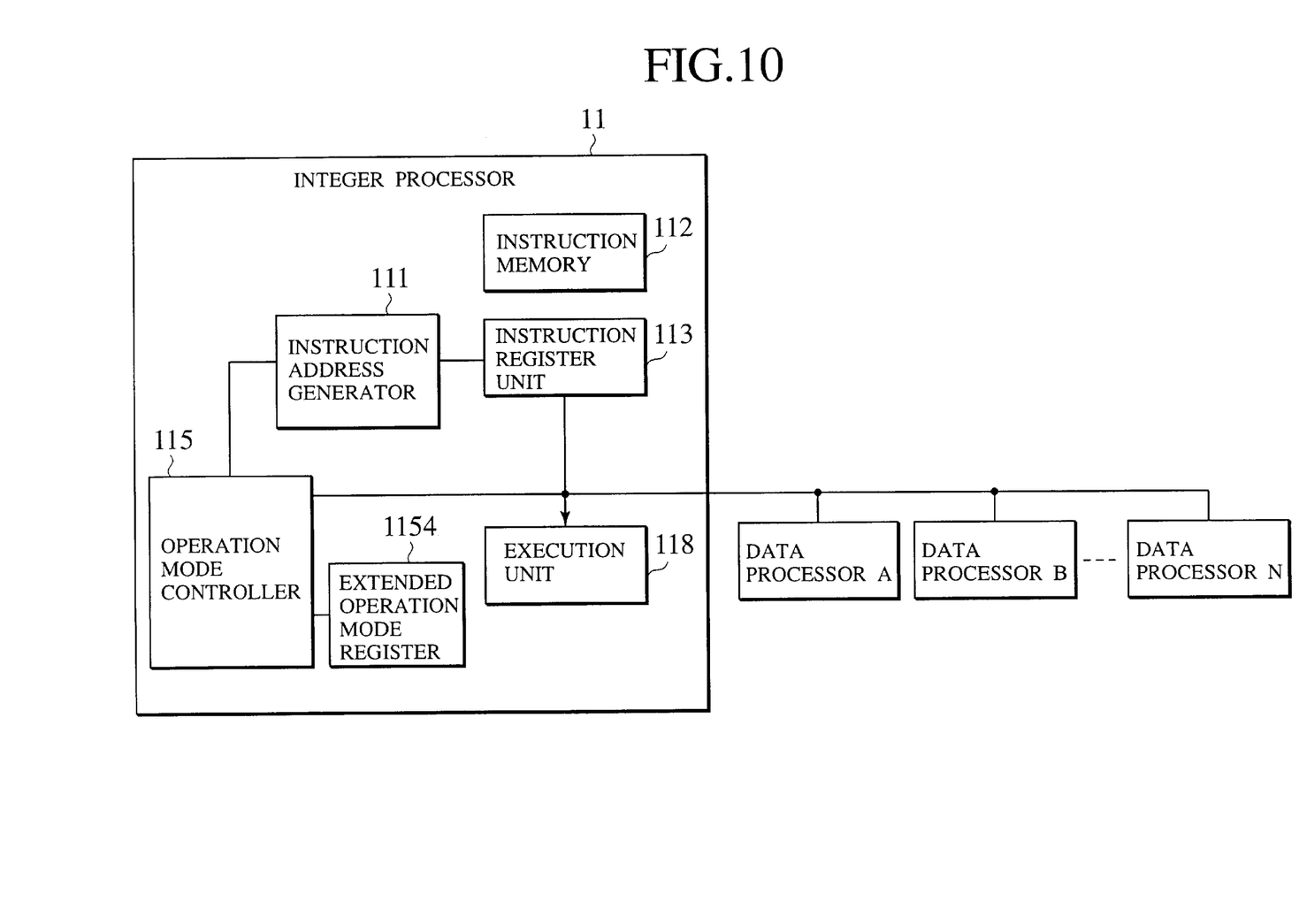
FIG. 10 is a block diagram showing an example of an arrangement of a multiple parallel processor apparatus according to a third embodiment of the present invention.

FIG. 10 is a block diagram depicting an arrangement of he processor apparatus in accordance with the third embodiment of the present invention. Hereinafter, like components are labeled with like reference numerals with respect to the first embodiment of FIG. 3, and the explanation of these components is omitted for ease of explanation.

The third embodiment provides a processor which can carry out (n+1) operations in one cycle.

The processor apparatus according to the third embodiment comprises the integer processor 11 and data processors A, B, . . . , N. In the integer processor operation mode, the instruction register unit 113 delivers the integer processor instruction to an execution unit 118, and supplies the no operation instructions to each of the data processors A, B, . . . , N.

In the parallel processing operation mode, the instruction register unit 113 delivers the integer processor instruction to the execution unit 118, and the data processor instructions to the data processors by which the data will be processed, for example, the data processors A and B, while supplying the no operation instruction to the rest of the data processors.

It should be noted that, as shown in FIG. 10, for example, information (extended operation mode information) that indicates which data processor out of all the data processors should be selected for the operation is held in an extended operation mode register 1154 placed under the control of the operation mode controller 115, so that the no operation instruction will be supplied to a specific data processor in accordance with the extended operation mode information.

In case that a large number of operations are carried out in one cycle as is in the third embodiment, the utilization of the instructions can be improved significantly.

According to the third embodiment, for example, it has become possible to quite efficiently carry out an instruction that defines the aforementioned SIMD arithmetic operation, by which arithmetic operations of different types of data are carried out simultaneously. In particular, in case of image processing in the multimedia environments, by employing the processor apparatus of the third embodiment, a group of 8-bit units of image pixel data totaling in 64 bits is supplied to each of a plurality of data processors as a plurality of data streams, and these groups are processed in parallel.

Further, as was in the second embodiment, the processor apparatus of the third embodiment may be controlled in such a manner that the data processors are halted by not supplying the clock to the data processors which will not be run. According to this arrangement, not only can the utilization of the extended instruction be improved, but also power consumption can be saved.

In the above embodiments, the 32-bit integer processor instruction and 32-bit data processor instruction were explained as examples. However, it should be appreciated that the arrangement is not limited to the foregoing. For example, the integer processor instructions may be 32-bit long and 16-bit long, and the data processor instructions may be 32-bit long and 48-bit long. Also, a total bits number of the integer processor instruction and data processor instruction was 64 bits. However, the total bits number is not limited to the foregoing, and can be 96, 128, etc. instead.

In addition, the main processor was explained as the unit that carries out the integer processing. However, the arrangement is not limited to the forgoing, and jobs can be assigned arbitrarily to the processor and coprocessor depending on the application used.

In summary, according to the parallel processor of the present invention, a plurality of operations can be carried out in one cycle, and in particular, when carrying out a single operation, not only can the availability of the instruction memory be improved without embedding the no operation instruction into an instruction that defines an operation of the data processor, but also the utilization of the extended instruction can be improved.

Various modifications will become possible for those skilled in the art after receiving the teachings of the present disclosure without departing from the scope thereof. It is intended, therefore, that all matter contained in the foregoing description and in the drawings shall be interpreted as illustrative only not as limitative of the invention.

What is claimed is:

1. A parallel processor for processing a plurality of operation instructions in one cycle in parallel, comprising:

a first operation processor; and at least one second operation processor, the first operation processor including, an operation mode retaining unit for retaining an operation mode indicating whether or not the second operation processor should be run in parallel to carry out an operation instruction, wherein the operation mode has a first operation mode in which the first operation processor alone is operated, and a second operation mode in which both of the first operation processor and the second operation processor are operated, a control unit for, in case that the operation mode is the first operation mode, in accordance with the operation mode, supplying the first operation processor with an instruction sequence that defines an operation of the first operation processor, and for generating a control signal to halt an operation of the second operation processor and supplying the control signal to the second operation processor, whereby as to an instruction of the first operation mode, the second operation processor is not operated without embedding an instruction that defines an operation of the second operation processor in the instruction sequence retained in an instruction memory, and an instruction execution unit for switching the operation mode in accordance with an input decoded instruction.

2. The parallel processor according to claim 1, wherein:

when the operation mode is the second operation mode, the control unit supplies the first operation processor with an instruction string that defines an operation of the first operation processor, and supplies the second operation processor with an instruction string that defines an operation of the second operation processor.

3. The parallel processor according to claim 1, wherein:
the control signal is a no operation instruction.

4. The parallel processor according to claim 1, wherein:
in the first operation mode, the instruction sequence retained in the instruction memory includes only an instruction that defines an operation of the first operation processor.

5. The parallel processor according to claim 3, wherein:
the control unit includes a no operation instruction retaining unit for retaining the no operation instruction; and
in the first operation mode, the instruction string retained in the instruction memory constantly includes a plurality of instructions.

6. The parallel processor according to claim 1, wherein:
the control signal is a signal that stops a supply of a clock to the second operation processor.

7. The parallel processor according to claim 1, wherein:
the control signal is a disable signal of the second operation processor.

8. The parallel processor according to claim 1, wherein:
the instruction execution unit switches the operation mode retained in the operation mode retaining unit by executing a sub-routine call instruction directing an operation mode switching.

9. The parallel processor according to claim 8, wherein:
the operation mode retaining unit is an operation mode register;
the control unit includes a first return address register for retaining a return address from the sub-routine call instruction;
the instruction execution unit, when executing the sub-routine call instruction, switches the operation mode by inverting a value in the operation mode register, and sets information indicating inversion of the operation mode in the first return address register, and
when returning from the sub-routine call instruction, refers to the information indicating the inversion of the operation mode set in the first return address register, and if the inversion is set, returns to the operation mode set before the sub-routine call instruction by inverting the value in the operation mode register.

10. The parallel processor according to claim 1, wherein:
the instruction execution unit switches the operation mode retained in the operation mode retaining unit at an occurrence of an exception.

11. The parallel processor according to claim 10, wherein:
the operation mode retaining unit is an operation mode register;
the control unit includes a second return address register for retaining a return address from an exception handling program by which the exception handling is carried out;
the instruction execution unit, at an occurrence of the exception, switches the operation mode by inverting the value in the operation mode register, and sets information indicating inversion of the operation mode in the second return address register, and
when returning from the exception, refers to the information indicating the inversion of the operation mode set in the second return address register, and if the inversion is set, returns to the operation mode set before the exception by inverting the value in the operation mode register.

12. The parallel processor according to claim 1, wherein:
the instruction execution unit switches the operation mode by inverting the value in the operation mode retaining unit in accordance with information indicating inversion of the operation mode contained in a part of a jump address defined in a jump instruction.

13. The parallel processor according to claim 1, wherein:
the second operation processor comprises a plurality of coprocessors; and
the control unit, in the first operation mode, operates the first operation processor alone by stopping clocks to the plurality of coprocessors other than the first operation processor.

14. The parallel processor according to claim 1, further comprising:
an extended operation mode retaining unit for retaining an extended operation mode indicating which of the plurality of second operation processors should be operated to carry out the operation instruction in parallel, wherein,
the control unit supplies the control signal to, in accordance with the extended operation mode, the second operation processor other than the second operation processor which is indicated by the extended operation mode.

15. A computer system equipped with a parallel processor for processing more than one operation instruction in one cycle, comprising:
a first operation processor;
at least one second operation processor; and
a data memory,
the first operation processor including,
an operation mode retaining unit for retaining an operation mode indicating whether or not the second operation processor should be run in parallel to carry out an operation instruction, wherein the operation mode has a first mode in which the first operation processor alone is operated, and a second operation mode in which both of the first operation processor and the second operation processor are operated,
a control unit for, in case that the operation mode is the first operation mode, in accordance with the operation mode, supplying the first operation processor with an instruction sequence that defines an operation of the first operation processor, and for generating a control signal to halt an operation of the second operation processor and supplying the control signal to the second operation processor, whereby as to an instruction of the first operation mode, the second operation processor is not operated without embedding an instruction that defines an operation of the second operation processor in the instruction sequence retained in an instruction memory, and
an instruction execution unit for switching the operation mode in accordance with an input decoded instruction.

16. The computer system according to claim 15, wherein:
when the operation mode is the second operation mode, the control unit supplies the first operation processor with an instruction string that defines an operation of the first operation processor, and supplies the second operation processor with an instruction string that defines an operation of the second operation processor.

17. The computer system according to claim 15, wherein:
the control signal is a no operation instruction.

18. The computer system according to claim 15, wherein:
in the first operation mode, the instruction string retained in the instruction memory includes only an instruction that defines an operation of the first operation processor.

19. The computer system according to claim 17, wherein:

the control unit includes a no operation instruction retaining unit for retaining the no operation instruction; and in the first operation mode, the instruction string retained in the instruction memory constantly includes a plurality of instructions.

20. The computer system according to claim 15, further comprising:

an extended operation mode retaining unit for retaining an extended operation mode indicating which of the plurality of second operation processors should be operated to carry out an operation instruction in parallel, wherein, the control unit supplies the control signal to, in accordance with the extended operation mode, the second operation processor other than the second operation processor which is indicated by the extended operation mode, and the control signal is a signal that stops a supply of a clock to the second operation processor.

* * * * *

UNITED STATES PATENT AND TRADEMARK OFFICE
CERTIFICATE OF CORRECTION

PATENT NO. : 6,675,290 B1
DATED : January 6, 2004
INVENTOR(S) : Miyamori

It is certified that error appears in the above-identified patent and that said Letters Patent is hereby corrected as shown below:

<u>Title page, Item [54] and Column 1, lines 1-5,</u>
Title, should read

-- DUAL PROCESSOR EMBEDDED INSTRUCTION PARALLEL PROCESSING SYSTEM WITH HALTING OF SECOND PROCESSOR ON SINGLE PROCESSOR INSTRUCTION MODE --

Signed and Sealed this

Fourth Day of May, 2004

JON W. DUDAS
*Acting Director of the United States Patent and Trademark Office*